United States Patent

3,779,972
Patented Dec. 18, 1973

3,779,972
PRESERVATIVES FOR AQUEOUS COMPOSITIONS WHICH CONTAIN ADDITION POLYMERS
Pasquale P. Minieri, Woodside, N.Y., assignor to Tenneco Chemicals, Inc.
No Drawing. Original application Nov. 22, 1971, Ser. No. 201,194, now abandoned. Divided and this application Mar. 15, 1973, Ser. No. 341,561
Int. Cl. C08d 11/00; C08f 45/64; C09d 5/14
U.S. Cl. 260—29.6 MN   9 Claims

ABSTRACT OF THE DISCLOSURE

Aqueous compositions that are subject to decomposition and spoilage by the action of bacteria are preserved by incorporating in them a small amount of a compound having the structural formula

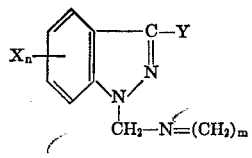

wherein X represents halogen, nitro, acoylamino, aroylamino, (halobenzylidene)amino, or methyleneimino; Y represents hydrogen, halogen, acoylamino, or methyleneimino; $m$ is a number in the range of 4 to 8; and $n$ is a number in the range of zero to 4. Illustrative of these compounds are N-(5,7-dichloroindazolyl - $N^1$ - methyl) piperidine and N-(3-chloro-5-nitroindazolyl-$N^1$-methyl) hexamethyleneimine.

---

This is a division of my now abandoned application Ser. No. 201,194, which was filed on Nov. 22, 1971.

This invention relates to a process for the preservation of aqueous compositions that are emulsions, dispersions, or solutions of organic substances that are subject to microbial attack.

Aqueous compositions of organic substances, such as latex paints, emulsified cutting oils, adhesives, hydraulic fluids, pulp dispersions used in papermaking, and cosmetic soaps, creams, and lotions, in the absence of an effective preservative are subject to attack by putrefactive bacteria which results in a reduction in viscosity, development of color, development of foul odors, formation of slime, breaking of emulsions, and the possibility of skin infections in people handling these materials.

A number of materials have been proposed as preservatives for the organic substances in aqueous compositions, but none meets all of the requirements that have been established for such preservatives. For example, formaldehyde and formaldehyde-release compounds are relatively volatile and do not give long-term protection. Organic mercury compounds are very effective as preservatives, but their use is limited because of their high mammalian toxicity. In order to be useful as the preservative in aqueous compositions which are subject to spoilage resulting from the action of microorganisms, the compound must meet the following requirements: It should be effective against the microorganisms at very low concentrations; it should be stable and soluble to some degree in water; it should be non-toxic and non-irritating to the skin in the amounts employed; it should be miscible with the organic solvents and other compounds that are commonly employed in the compositions subject to spoilage; it should be effective over a wide range of pH values so that it can be used in formulations of varied composition and pH; it should be free from objectionable odor; and it should be relatively low in cost.

In accordance with this invention, it has been found that certain substituted indazoles satisfy the aforementioned requirements and are effective as preservatives for a wide variety of aqueous compositions that are subject to microbial attack. These substituted indazoles have the structural formula

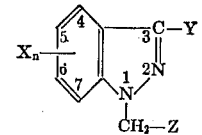

wherein X represents chlorine, bromine, fluorine, iodine, nitro, acetamino, propionamino, butyramino, benzoylamino, methyleneimino, (chlorobenzylidene)amino, (bromobenzylidene)amino, or (iodobenzylidene)amino; Y represents hydrogen, chlorine, bromine, iodine, fluorine, acetamino, propionamino, butyramino, or methyleneimino; Z represents chlorine, bromine, fluorine, iodine, hydroxyl, $-N=(CH_2)_m$, or $-N_4(CH_2)_6{}^+R^-$; R represents chlorine, bromine, fluorine, or iodine, $m$ represents a number in the range of 4 to 8; and $n$ represents a number in the range of zero to 4. Illustrative of these compounds are the following:

$N^1$-hydroxymethyl-3-chloroindazole,
$N^1$-hydroxymethyl-3-bromo-6-nitroindazole,
$N^1$-hydroxymethyl-3-iodo-6-nitroindazole,
$N^1$-hydroxymethyl-3-acetaminoindazole,
$N^1$-hydroxymethyl-3-methyleneiminoindazole,
$N^1$-hydroxymethyl-6-acetaminoindazole,
$N^1$-hydroxymethyl-5,7-dichloroindazole,
$N^1$-hydroxymethyl-4,5,7-trichloroindazole,
$N^1$-hydroxymethyl-3,5,7-trichloroindazole,
$N^1$-hydroxymethyl-5,6,7-trichloroindazole,
$N^1$-hydroxymethyl-4,5,6,7-tetrachloroindazole,
$N^1$-hydroxymethyl-3,4,5,6,7-pentachloroindazole,
$N^1$-hydroxymethyl-6-methyleneiminoindazole,
$N^1$-chloromethyl-3-chloro-5,6-dinitroindazole,
$N^1$-chloromethyl-4-chloroindazole,
$N^1$-chloromethyl-5,7-dichloroindazole,
$N^1$-chloromethyl-3,5,6-trichloroindazole,
$N^1$-chloromethyl-3,5,7-trichloroindazole,
$N^1$-chloromethyl-4,5,6,7-tetrachloroindazole,
$N^1$-chloromethyl-6-benzoylaminoindazole,
$N^1$-bromomethyl-3-bromo-6-nitroindazole,
$N^1$-iodomethyl-5-propionaminoindazole,
N-(5-chloroindazolyl-$N^1$-methyl)piperidine,
N-(5,6-dinitroindazolyl-$N^1$-methyl)-3-methylpiperidine,
N-[6-(3,4-dichlorobenzylidene)aminoindazolyl-$N^1$-methyl]hexamethyleneimino,
N-[6-(p-bromobenzylidene)aminoindazolyl-$N^1$-methyl]hexamethyleneimino,
N-(3-chloroindazolyl-$N^1$-methyl)hexamethylenetetraammonium chloride,
N-(3-bromo-6-nitroindazolyl-$N^1$-methyl)heaxmethylenetetraammonium bromide, and the like.

The substituted indazoles of this invention may be prepared by any suitable and convenient procedure. For example, the $N^1$-hydroxymethyl compounds may be prepared by heating the appropriate substituted indazoles with paraformaldehyde, and the $N^1$-chloromethyl compounds may be prepared by heating the appropriate $N^1$-hydroxymethyl compounds with thionyl chloride. These reactions are generally carried out in a solvent, such as benzene, toluene, xylene, acetone, pyridine, ethanol, or ethylene dichloride, at the reflux temperature of the reaction mixture. The preparation and properties of the biocidal compounds of this invention are described in my copending applications Ser. No. 589,235, which was filed on Oct. 25, 1966, and which is now U.S. Pat. No. 3,637,736; Ser. No. 689,812, which was filed on Dec. 12, 1967, and which is now U.S. Pat. No. 3,641,050; Ser. No. 141,999, which was filed on May 10, 1971; Ser. No. 201,159, which was filed on Nov. 22, 1971; and Ser. No. 201,178, which was filed on Nov. 22, 1971, now U.S. Pat. No. 3,730,954 granted May 1, 1973.

In a preferred embodiment of this invention, the substituted indazoles are used as the preservative in a wide variety of aqueous surface-coating compositions. The aqueous coating compositions that contain these substituted indazoles are stable and do not show signs of degradation caused by bacterial activity after storage at room temperature for 6 months or more.

The surface-coating compositions to which the substituted indazoles may be added as preservatives are aqueous dispersions that contain about 10 percent to 60 percent by weight of a water-insoluble resinous binder that is a synthetic linear addition polymer and/or an oleoresinous binder. The useful aqueous dispersions of synthetic linear addition polymers are ordinarily prepared by the emulsion polymerization of ethylenically-unsaturated monomers. Illustrative of these polymers are polyvinyl acetate; polyvinyl butyrate; polyvinyl chloride; copolymers of vinyl acetate with vinyl chloride or acrylonitrile; copolymers of vinyl chloride with acrylonitrile or vinylidene chloride; polyethylene; polyisobutylene; copolymers of styrene with butadiene, acrylonitrile, or maleic anhydride; copolymers of acrylic acid esters or methacrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and mixtures thereof. Suitable oleoresinous binders include drying oils, bodied drying oils, oleoresinous varnishes, alkyd resins, and mixtures thereof.

Only a small amount of the substituted indazole is required to protect the aqueous surface-coating composition from attack by bacteria. As little as 0.10 percent of one or more of these compounds, based on the weight of the composition, will bring about an appreciable improvement in the resistance of the composition to attack by bacteria. One percent or more of the biocidal compounds can be used, but these larger amounts ordinarily do not provide further improvement in the properties of the compositions and for this reason are not usually used. While the amount of the substituted indazoles that will provide optimum protection for an aqueous surface-coating composition depends upon such factors as the choice of the biocidal compound, the choice of resinous binder and other ingredients of the composition and the amount of each of these materials that is used, it is generally preferred to use 0.2 percent to 0.4 percent of the biocidal compound, based on the weight of the surface-coating composition.

In addition to the resinous binder and the biocidal compound, the surface-coating compositions may contain various auxiliary materials, such as pigments, extenders, solvents, dyes, defoaming agents, driers, thickeners, emulsifiers, plasticizers, and the like in the amounts ordinarily used for these purposes.

The biocidal compounds may be incorporated into the surface-coating compositions by any convenient procedure. For example, they can be combined with the pigments and other ingredients to form a pigment phase that is mixed with the resinous binder and water to form the surface-coating composition. Alternatively, they can be added to a composition that contains the resinous binder, pigment, and water. The biocidal compounds can be added as such to the other ingredients, or they can be added as a solution in, for example, an alcohol, ether, hydrocarbon, or ketone.

The invention is further illustrated by the following examples.

EXAMPLE 1

(A) A polyvinyl acetate latex paint was prepared by mixing together the following materials:

| | Parts by weight |
|---|---|
| Water | 481.5 |
| 25% aqueous solution of sodium salt of maleic anhydride/diisobutylene copolymer | 24 |
| Potassium pyrophosphate | 3 |
| Long chain fatty acid alkanolamide | 9 |
| Defoamer | 6 |
| Ethylene glycol | 75 |
| 1¼% aqueous solution of hydroxyethyl cellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint testing procedures:

| | |
|---|---|
| Viscosity | K.U. 65 |
| Brookfield viscosity (No. 4 spindle, 60 r.p.m.) cps | 800 |
| pH | 7.8 |
| Yellowness index | 3.0 |

Small amounts of the biocidal compounds of this invention or comparative biocides were added to portions of this paint, and the resulting treated paints were mixed for 24 hours on a ball-mill.

(B) The paints prepared in Example 1A were evaluated by the following procedures:

A mixed bacterial inoculum consisting of *Pseudomonas aeruginosa* ATCC 10145, *Aerobacter aerogenes* ATCC 7256, *Bacillus subtilis*, *Bacillus megsterium* and *Bacillus licheniformis* was prepared by incubation of inoculated (0.5 ml.) milk dilution bottles containing 50 ml. of solidified Trypticase-soy agar.

After incubation for 18 to 24 hours at 35° C., the cultures were removed from the agar surface, diluted to an appropriate volume in phosphate buffer (0.05 M, pH 7.0), and inoculated into 300 gram portions of the test paints. The amount of the culture added to the paint was such that the final level of bacteria was between $0.5 \times 10^6$ and $3 \times 10^6$ per gram of paint. After thorough mixing, the paints were incubated at 35° C. under 90 percent relative humidity. At intervals during the incubation, measurements of viability of the bacteria and viscosity of the paint were made. The viability test was carried out by adding an aliquot of the paint to Trypticase-soy broth, incubating for 48 hours at 35° C., and then streaking it on a Trypicase-soy agar plate. After a 24 hour incubation period at 35° C., the plates were examined for growth along the streak. The results obtained are reported in Table I as + (growth present) or − (growth absent). The viscosity of the paint samples was measured with a Brookfield viscometer using a No. 3 spindle at 60 r.p.m. The percentage decrease of the viscosity of each of the treated paints during the incubation period is reported in Table I.

EXAMPLE 2

(A) An acrylic latex paint was prepared by mixing together the following materials:

| | Parts by weight |
|---|---|
| Water | 168 |
| Alkyl aryl ether surfactant | 6 |
| 25% aqueous solution of sodium salt of maleic anhydride/diisobutylene copolymer | 27 |

TABLE I.—SUBSTITUTED INDAZOLES AS PRESERVATIVES FOR POLYVINYL ACETATE LATEX PAINT

| Ex. No. | Biocide | Concentration of biocide (percent) | Viability incubation period (days) | | | | | Percent total decrease in viscosity, incubation period (days) | | | | |
|---|---|---|---|---|---|---|---|---|---|---|---|---|
| | | | 1 | 2 | 5 | 12 | 21 | 1 | 2 | 5 | 12 | 21 |
| 1A | N¹-hydroxymethyl-3-chloroindazole | 0.4 | + | + | − | − | − | 8 | 10 | 15 | 17 | 15 |
| | | 0.1 | + | + | + | − | − | 14 | 20 | 29 | 32 | 35 |
| 1B | N¹-hydroxymethyl-5-chloroindazole | 0.4 | + | + | − | − | − | 12 | 15 | 18 | 20 | 23 |
| | | 0.1 | + | + | + | − | − | 20 | 26 | 30 | 35 | 40 |
| 1C | N¹-hydroxymethyl-3,5-dichloroindazole | 0.4 | + | + | − | − | − | 6 | 8 | 11 | 11 | 10 |
| | | 0.1 | + | + | + | − | − | 14 | 18 | 25 | 26 | 28 |
| 1D | N¹-hydroxymethyl-5,7-dichloroindazole | 0.4 | + | + | − | − | − | 5 | 8 | 13 | 15 | 18 |
| | | 0.1 | + | + | + | − | − | 12 | 17 | 22 | 25 | 30 |
| 1E | N¹-hydroxymethyl-5-nitroindazole | 0.4 | + | + | − | − | − | 8 | 13 | 15 | 20 | 22 |
| | | 0.1 | + | + | + | − | − | 12 | 18 | 23 | 27 | 38 |
| 1F | N¹-hydroxymethyl-6-nitroindazole | 0.4 | + | + | − | − | − | 5 | 8 | 10 | 14 | 16 |
| | | 0.1 | + | + | + | − | − | 5 | 11 | 20 | 30 | 33 |
| 1G | N¹-hydroxymethyl-5,6-dinitroindazole | 0.4 | + | + | − | − | − | 3 | 5 | 12 | 15 | 19 |
| | | 0.1 | + | + | + | − | − | 10 | 12 | 20 | 32 | 38 |
| 1H | N¹-hydroxymethyl-3-chloro-5-nitroindazole | 0.4 | + | + | − | − | − | 10 | 13 | 17 | 21 | 25 |
| | | 0.1 | + | + | + | − | − | 10 | 15 | 19 | 30 | 40 |
| 1I | N¹-hydroxymethyl-6-acetaminoindazole | 0.4 | + | + | + | − | − | 10 | 13 | 18 | 23 | 29 |
| | | 0.1 | + | + | + | + | − | 15 | 22 | 35 | 49 | 52 |
| 1J | N¹-chloromethyl-6-nitroindazole | 0.4 | + | + | + | − | − | 8 | 10 | 18 | 22 | 25 |
| | | 0.1 | + | + | + | + | − | 10 | 15 | 28 | 36 | 40 |
| 1K | N¹-chloromethyl-3-chloro-5-nitroindazole | 0.4 | + | + | + | − | − | 8 | 19 | 24 | 30 | 35 |
| | | 0.1 | + | + | + | + | − | 15 | 20 | 36 | 45 | 50 |
| 1L | N¹-chloromethyl-3-chloro-6-nitroindazole | 0.4 | + | + | + | − | − | 6 | 9 | 11 | 16 | 17 |
| | | 0.1 | + | + | + | − | − | 10 | 19 | 28 | 33 | 30 |
| 1M | N¹-chloromethyl-5,6-dinitroindazole | 0.4 | + | + | + | − | − | 2 | 6 | 8 | 9 | 10 |
| | | 0.1 | + | + | + | + | − | 18 | 21 | 35 | 38 | 40 |
| 1N | N-(5-nitroindazolyl-N¹-methyl)piperidine | 0.4 | + | + | + | − | − | 8 | 10 | 16 | 22 | 25 |
| | | 0.1 | + | + | + | + | + | 18 | 24 | 36 | 43 | 50 |
| 1O | N-(3-chloro-5-nitroindazolyl-N¹-methyl)piperidine | 0.4 | + | + | + | − | − | 8 | 16 | 20 | 28 | 32 |
| | | 0.1 | + | + | + | + | − | 22 | 30 | 39 | 48 | 52 |
| 1P | N-(6-nitroindazolyl-N¹-methyl)piperidine | 0.4 | + | + | + | − | − | 5 | 12 | 19 | 22 | 25 |
| | | 0.1 | + | + | + | + | − | 19 | 28 | 46 | 52 | 55 |
| 1Q | N-(5,6-dinitroindazolyl-N¹-methyl)piperidine | 0.4 | + | + | + | − | − | 12 | 15 | 22 | 26 | 30 |
| | | 0.1 | + | + | + | + | − | 25 | 38 | 42 | 48 | 50 |
| 1R | N-(3-chloroindazolyl-N¹-methyl)hexamethyleneimine | 0.4 | + | + | + | − | − | 6 | 8 | 12 | 20 | 25 |
| | | 0.1 | + | + | + | + | + | 21 | 28 | 40 | 50 | 56 |
| 1S | N-(5-nitroindazolyl-N¹-methyl)hexamethyleneimine | 0.4 | + | + | + | − | − | 8 | 12 | 18 | 20 | 21 |
| | | 0.1 | + | + | + | − | − | 16 | 20 | 25 | 36 | 40 |
| 1T | N-(3-chloro-5-nitroindazolyl-N¹-methyl)hexamethyleneimine | 0.4 | + | + | + | − | − | 15 | 22 | 28 | 32 | 35 |
| | | 0.1 | + | + | + | + | − | 25 | 36 | 45 | 50 | 50 |
| 1U | N-(3-chloro-6-nitroindazolyl-N¹-methyl)hexamethylene tetraammonium chloride | 0.4 | + | + | − | − | − | 3 | 8 | 12 | 15 | 19 |
| | | 0.1 | + | + | + | − | − | 15 | 19 | 22 | 30 | 35 |
| Comparison: | | | | | | | | | | | | |
| Ex. A | Formaldehyde (37% stabilized) | 0.4 | + | + | − | − | − | 7 | 14 | 16 | 29 | 27 |
| | | 0.1 | + | + | − | − | − | 11 | 37 | 44 | 56 | 54 |
| Ex. B | Phenylmercuric acetate (18% Hg) | 0.1 | + | − | − | − | − | 0 | 2 | 5 | 8 | 8 |
| | | 0.05 | + | + | − | − | − | 8 | 12 | 15 | 18 | 20 |
| Ex. C | None | | + | + | + | + | + | 35 | 50 | 67 | 65 | 65 |

| | Parts by weight |
|---|---|
| Defoamer | 12 |
| 2% aqueous solution of hydroxyethylcellulose | 300 |
| Ethylene glycol | 60 |
| Titanium dioxide | 750 |
| Mica (waterground) | 90 |
| Calcium carbonate | 375 |
| Ammonium hydroxide (28%) | 6 |
| Aqueous dispersion containing 46% acrylic ester copolymer (66% ethyl acrylate, 32.5% methyl acrylate, and 1.5% acrylic acid) | 1642 |

This paint had the following properties:

| | |
|---|---|
| Viscosity K.U. | 72 |
| Brookfield viscosity (#3 spindle, 60 r.p.m.) (cps.) | 1250 |
| Yellowness index | 2.6 |
| pH | 9.2 |

Small amounts of the biocidal compounds of this invention or comparative biocides were added to portions of this paint, and the resulting treated paints were mixed for 24 hours on a ball-mill.

(B) The paints prepared by the foregoing procedure were evaluated by the test procedures described in Example 1B. The results obtained are given in Table II.

EXAMPLE 3

A cosmetic lotion was prepared from the following materials:

| | Parts by weight |
|---|---|
| Petrolatum | 7.5 |
| Mineral oil | 37.5 |
| Beeswax | 2.0 |
| Polyoxyethylene sorbitol lanolin derivative (Atlas G-1425) | 4.5 |

TABLE II.—SUBSTITUTED INDAZOLES AS PRESERVATIVES FOR ACRYLIC LATEX PAINT

| Ex. No. | Biocide | Concentration of biocide (percent) | Viability incubation period (days) | | | | | Percent total decrease in viscosity, incubation period (days) | | | | |
|---|---|---|---|---|---|---|---|---|---|---|---|---|
| | | | 1 | 2 | 5 | 12 | 21 | 1 | 2 | 5 | 12 | 21 |
| 2A | N¹-hydroxymethyl-3-chloroindazole | 0.4 | + | + | + | − | − | 5 | 5 | 8 | 10 | 10 |
| | | 0.1 | + | + | + | − | − | 0 | 0 | 7 | 10 | 10 |
| 2B | N¹-hydroxymethyl-5-chloroindazole | 0.4 | + | + | + | − | − | 0 | 5 | 8 | 8 | 10 |
| | | 0.1 | + | + | + | + | − | 6 | 8 | 10 | 15 | 19 |
| 2C | N¹-hydroxymethyl-3,5-dichloroindazole | 0.4 | + | + | + | − | − | 5 | 8 | 8 | 10 | 11 |
| | | 0.1 | + | + | + | + | − | 5 | 8 | 10 | 10 | 10 |
| 2D | N¹-hydroxymethyl-5,7-dichloroindazole | 0.4 | + | + | + | − | − | 5 | 5 | 8 | 10 | 13 |
| | | 0.1 | + | + | + | + | − | 9 | 12 | 15 | 16 | 20 |
| 2E | N¹-hydroxymethyl-6-acetaminoindazole | 0.4 | + | + | + | − | − | 2 | 5 | 8 | 12 | 15 |
| | | 0.1 | + | + | + | + | − | 5 | 9 | 13 | 19 | 22 |
| 2F | N¹-chloromethyl-3-chloro-6-nitroindazole | 0.4 | + | + | + | − | − | 5 | 5 | 6 | 6 | 8 |
| | | 0.1 | + | + | + | − | − | 5 | 9 | 9 | 10 | 12 |
| 2G | N¹-chloromethyl-5,6-dinitroindazole | 0.4 | + | + | + | − | − | 5 | 5 | 10 | 10 | 11 |
| | | 0.1 | + | + | + | + | − | 8 | 10 | 11 | 13 | 15 |
| 2H | N-(5-nitroindazolyl-N¹-methyl)hexamethyleneimine | 0.4 | + | + | + | − | − | 3 | 8 | 10 | 11 | 13 |
| | | 0.1 | + | + | + | + | + | 6 | 9 | 13 | 15 | 22 |
| Comparison: | | | | | | | | | | | | |
| Ex. D | Formaldehyde (37% stabilized) | 0.4 | + | + | + | + | + | 6 | 7 | 8 | 10 | 10 |
| | | 0.1 | + | + | + | + | + | 4 | 8 | 10 | 12 | 15 |
| Ex. E | Phenylmercuric acetate (18% Hg) | 0.1 | + | + | − | − | − | 0 | 2 | 3 | 2 | 2 |
| | | 0.05 | + | + | − | − | − | 2 | 5 | 6 | 8 | 10 |
| Ex. F | None | | + | + | + | + | + | 5 | 10 | 17 | 20 | 25 |

| | Parts by weight |
|---|---|
| Sorbitan sesquioleate | 2.0 |
| Water | 46.2 |
| $N^1$-hydroxymethyl-3,5-dichloroindazole | 0.3 |

All of the ingredients except the preservative and water were heated together to 75° C., and the remaining ingredients were heated together to 77° C. The aqueous phase was added to the non-aqueous phase slowly with stirring which was continued until the preparation had cooled to room temperature.

After standing for 2 weeks at room temperature, the lotion showed no sign of bacterial growth.

EXAMPLE 4

An aqueous cutting oil emulsion was prepared by the following procedure: A mixture of a light mineral oil, an organic emulsifier, an aliphatic alcohol coupling agent, and minor amounts of other components was diluted with forty parts of water per part of said mixture to form an emulsion. To a sample of this emulsion was added 0.3 percent by weight of $N^1$-hydroxymethyl - 5,7 - dichloroindazole and 5 percent by weight of a cutting oil emulsion which was badly contaminated with bacterial growth after industrial use. The inoculated sample was shaken at room temperature. After 24 hours and 48 hours swabs of the sample were streaked on nutrient agar plates which were incubated for 48 hours at 30° C. before examination. In neither case was there bacterial growth on the agar plates.

Each of the other substituted indazoles disclosed herein can be used in a similar manner to prevent the growth of bacteria in aqueous compositions that contain organic materials that are subject to deterioration by the action of bacteria.

What is claimed is:

1. A surface-coating composition that is resistant to spoilage by the action of bacteria that comprises an aqueous composition that contains about 10 percent to 60 percent by weight of a synthetic linear addition polymer prepared by the emulsion polymerization of ethylenically-unsaturated monomers and 0.1 percent to 1.0 percent, based on the weight of said composition, of a bactericidal compound having the structural formula

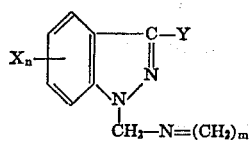

wherein X represents halogen, nitro, acoylamino, aroylamino, (halobenzylidene)amino, or methyleneimino; Y represents hydrogen, halogen, acoylamino, or methyleneimino; $m$ is a number in the range of 4 to 8; and $n$ is a number in the range of zero to 4.

2. A composition as defined in claim 1 wherein the aqueous composition contains about 10 percent to 60 percent of polyvinyl acetate.

3. A composition as defined in claim 1 wherein the aqueous composition contains about 10 percent to 60 percent of an acrylate polymer.

4. A composition as defined in claim 1 that contains 0.2 percent to 0.4 percent of said bactericidal compound.

5. A composition as defined in claim 1 wherein the bactericidal compound is N - (5 - chloroindazolyl-$N^1$-methyl)piperidine.

6. A composition as defined in claim 1 wherein the bactericidal compound is N - (5,7-dichloroindazolyl-$N^1$-methyl)piperidine.

7. A composition as defined in claim 1 wherein the bactericidal compound is N - (5,6-dinitroindazolyl-$N^1$-methyl)piperidine.

8. A composition as defined in claim 1 wherein the bactericidal compound is N - (3 - chloroindazolyl-$N^1$-methyl)hexamethyleneimine.

9. A composition as defined in claim 1 wherein the bactericidal compound is N - (3-chloro-5-nitroindazolyl-$N^1$-methyl)hexamethyleneimine.

References Cited

UNITED STATES PATENTS

| 2,922,794 | 1/1960 | Model et al. | 260—304 |
| 3,317,448 | 5/1967 | Prindle et al. | 260—29.6 MN |
| 3,325,436 | 6/1967 | Prindle et al. | 260—29.6 MN |
| 3,523,121 | 8/1970 | Lewis et al. | 260—306.7 |

WILLIAM H. SHORT, Primary Examiner

L. M. PHYNES, Assistant Examiner

U.S. Cl. X.R.

106—15 R; 260—17 R, 29.6 HN, N, 29.7 N, 41 A, B, 78.5 R, T, 83.7, 85.5 ES, XA, 86.1 E, 89.1, 92.8 A, 94.8, 94.9 A, GB; 424—78, 81, 244, 273, 365

UNITED STATES PATENT OFFICE
CERTIFICATE OF CORRECTION

Patent No. 3,779,972          Dated December 18, 1973

Inventor(s) Pasquale P. Minieri

It is certified that error appears in the above-identified patent and that said Letters Patent are hereby corrected as shown below:

Column 2, line 53, change "methyl]hexamethyleneimino" to
-- methyl]hexamethyleneimine --.

Column 2, line 55, change "hexamethyleneimino" to
-- hexamethyleneimine --.

Column 2, line 58, change "heaxmethylene" to
-- hexamethylene --.

Signed and sealed this 16th day of April 1974.

(SEAL)
Attest:

EDWARD M. FLETCHER, JR.
Attesting Officer

C. MARSHALL DANN
Commissioner of Patents